(12) United States Patent
Kim

(10) Patent No.: US 8,996,708 B2
(45) Date of Patent: Mar. 31, 2015

(54) METHOD OF PROVIDING CONTENT INFORMATION USING WIRELESS COMMUNICATION DEVICE AND NAVIGATION DEVICE PERFORMING THE SAME

(75) Inventor: Jongwon Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 255 days.

(21) Appl. No.: 13/002,364

(22) PCT Filed: Jun. 29, 2009

(86) PCT No.: PCT/KR2009/003519
§ 371 (c)(1),
(2), (4) Date: Feb. 18, 2011

(87) PCT Pub. No.: WO2010/002162
PCT Pub. Date: Jan. 7, 2010

(65) Prior Publication Data
US 2011/0191824 A1 Aug. 4, 2011

(30) Foreign Application Priority Data
Jul. 3, 2008 (KR) .......................... 10-2008-0064358

(51) Int. Cl.
*G06F 15/173* (2006.01)
*G06F 15/16* (2006.01)
(Continued)

(52) U.S. Cl.
CPC ...... *G08G 1/096775* (2013.01); *G01C 21/3691* (2013.01); *G01C 21/3697* (2013.01);
(Continued)

(58) Field of Classification Search
CPC ......... H04L 67/12; H04L 67/14; H04L 67/16; H04L 67/18; H04L 67/26; H04L 29/06; H04L 12/58; H04L 12/1259; H04L 63/10; H04L 63/20; H04L 63/101; H04L 63/083; H04L 63/0838

USPC ............................ 707/10; 726/3; 713/200, 3; 709/226–229, 238; 455/72, 406, 456.1, 455/558, 566
See application file for complete search history.

(56) References Cited

U.S. PATENT DOCUMENTS 6,532,418 B2 * 3/2003 Chun et al. ..................... 701/410
7,071,843 B2 * 7/2006 Hashida et al. .......... 340/995.12
(Continued)

FOREIGN PATENT DOCUMENTS

CN 1591514 A 3/2005
EP 1 455 501 9/2004
(Continued)

OTHER PUBLICATIONS

Notification of Third Office Action from State Intellectual Property Office of People's Republic of China.
(Continued)

*Primary Examiner* — David Lazaro
*Assistant Examiner* — Farzana Huq
(74) *Attorney, Agent, or Firm* — Fox Rothschild, LLP

(57) ABSTRACT

A method of providing content information using a wireless communication device and a navigation device of performing the method are disclosed. The navigation device may comprise a terminal searching unit that searches a wireless communication terminal that may perform near field wireless communication in response to a content information providing request, a terminal authenticating unit that performs terminal authentication on whether the searched wireless communication terminal has been subscribing for a content providing service, and a content information displaying unit that, if it is identified that the wireless communication terminal is a terminal subscribing for the content providing service, receives content information from the wireless communication terminal and displays the content information on a display.

11 Claims, 7 Drawing Sheets

(51) Int. Cl.
*G06F 7/04* (2006.01)
*H04B 1/00* (2006.01)
*H04M 11/00* (2006.01)
*H04W 24/00* (2009.01)
*H04B 1/38* (2006.01)
*G08G 1/0967* (2006.01)
*G01C 21/36* (2006.01)
*G08G 1/0962* (2006.01)
*H04W 12/06* (2009.01)
*H04W 4/00* (2009.01)
*H04M 1/60* (2006.01)
*H04M 1/725* (2006.01)
*H04W 8/00* (2009.01)
*H04W 88/04* (2009.01)
*H04W 76/02* (2009.01)
*H04L 29/08* (2006.01)

(52) U.S. Cl.
CPC ........ *G08G1/0962* (2013.01); *G08G 1/096716* (2013.01); *H04W 12/06* (2013.01); *H04W 4/008* (2013.01); *H04M 1/6075* (2013.01); *H04M 1/7253* (2013.01); *H04W 8/005* (2013.01); *H04W 88/04* (2013.01); *H04W 76/023* (2013.01); *H04L 67/12* (2013.01)
USPC ........... 709/229; 709/226; 709/227; 709/228; 709/238; 726/3; 455/72; 455/406; 455/456.1; 455/558; 455/566

(56) References Cited

U.S. PATENT DOCUMENTS

| | | | |
|---|---|---|---|
| 7,113,765 B2* | 9/2006 | Minear et al. | 455/405 |
| 7,304,653 B2 | 12/2007 | Ueno | |
| 2002/0174360 A1* | 11/2002 | Ikeda | 713/200 |
| 2003/0065440 A1* | 4/2003 | Oda et al. | 701/202 |
| 2006/0236258 A1* | 10/2006 | Othmer et al. | 715/774 |
| 2007/0130153 A1* | 6/2007 | Nachman et al. | 707/10 |
| 2008/0319652 A1* | 12/2008 | Moshfeghi | 701/208 |

FOREIGN PATENT DOCUMENTS

| | | |
|---|---|---|
| EP | 1 640 902 | 3/2006 |
| EP | 1063625 | 1/2007 |
| EP | 2 306 432 | 4/2011 |
| KR | 10-2006-0044581 | 5/2006 |
| KR | 10-2007-0042052 | 4/2007 |
| WO | 2008/031022 | 3/2008 |

OTHER PUBLICATIONS

English Translation of Notification of Third Office Action from State Intellectual Property Office of People's Republic of China.

* cited by examiner

METHOD OF PROVIDING CONTENT INFORMATION USING WIRELESS COMMUNICATION DEVICE AND NAVIGATION DEVICE PERFORMING THE SAME

CROSS-REFERENCE TO RELATED APPLICATIONS

This application is the national stage entry under 35 USC 371 for: PCT/KR2009/003519, filed on Jun. 29, 2009, which claims the benefit of the Jul. 3, 2008 priority date of Korean application 10-2008-0064358. The contents of both the foregoing applications are incorporated herein by reference.

TECHNICAL FIELD

The present invention relates to a method of providing content information using a wireless communication device and a navigation device performing the method, and more specifically to a method of directly or indirectly receiving content information through a wireless communication device and providing the content information to a user and a navigation device performing the method.

BACKGROUND ART

In general, a main object of navigation devices is to guide a path to a destination which is set by a user. As more and more time is spent in a vehicle and a navigation device includes more functions, various businesses flourishes using navigation devices.

However, navigations devices may utilize content information pre-stored therein but not may process data provided in real time. Functions of navigation devices are shifted from path guidance for drivers to provision of infotainment services for passengers. However, it is difficult to provide infotainment services using conventional navigation systems.

Resultantly, in spite of existence of various contents, a navigation device may only utilize limited contents.

DISCLOSURE

Technical Problem

The present invention provides a method of providing content information using a wireless communication device and a navigation device performing the method, which may implement content-telematics functions by using various content information in the navigation device using the wireless communication device.

The present invention provides a method of providing content information using a wireless communication device and a navigation device performing the method, which may implement both traffic information services mainly for driver and life information services mainly for passenger by using traffic information and life information in the navigation device using the wireless communication device.

The present invention provides a method of providing content information using a wireless communication device and a navigation device performing the method, which may expand functions of the navigation device by receiving various content information in the navigation device through the wireless communication device.

Technical Solution

A navigation device according to an embodiment of the present invention may comprise a terminal searching unit that searches a wireless communication terminal that may perform near field wireless communication in response to a content information providing request, a terminal authenticating unit that performs terminal authentication on whether the searched wireless communication terminal has been subscribing for a content providing service, and a content information displaying unit that, if it is identified that the wireless communication terminal is a terminal subscribing for the content providing service, receives content information from the wireless communication terminal and displays the content information on a display.

According to another embodiment of the present invention, a navigation device may comprise a server connecting unit that performs wireless connection with a content managing server through a wireless Internet connecting device in response to a content information providing request, an authentication performing unit that performs device authentication on whether a navigation device is subscribing for a content providing service, and a content information displaying unit that receives content information from the content managing server through the wireless Internet access device and displays the content information on a display.

A method of providing content information through a navigation device according to an embodiment of the present invention may comprise searching a wireless communication terminal that may perform near field wireless connection in response to a content information providing request, performing terminal authentication on whether the searched wireless communication terminal is subscribing for a content providing service, and receiving content information from the wireless communication terminal and displaying the content information on a display if it is identified that the wireless communication terminal is a terminal subscribing for the content providing service.

According to another embodiment of the present invention, a method of providing content information through a navigation device may comprise performing wireless connection with a content managing server through a wireless Internet access device in response to a content information providing request, performing device authentication on whether a navigation device is subscribing for a content providing service, and receiving content information from the content managing server through the wireless Internet access device and displaying the content information on a display.

Advantageous Effects

According to the present invention, a method of providing content information using a wireless communication device and a navigation device performing the method, which may implement content-telematics functions by using various content information in the navigation device using the wireless communication device, are provided.

According to the present invention, a method of providing content information using a wireless communication device and a navigation device performing the method, which may implement both traffic information services mainly for driver and life information services mainly for passenger by using traffic information and life information in the navigation device using the wireless communication device, are provided.

According to the present invention provides a method of providing content information using a wireless communication device and a navigation device performing the method, which may expand functions of the navigation device by receiving various content information in the navigation device through the wireless communication device, are provided.

BEST MODE

Figure 1:
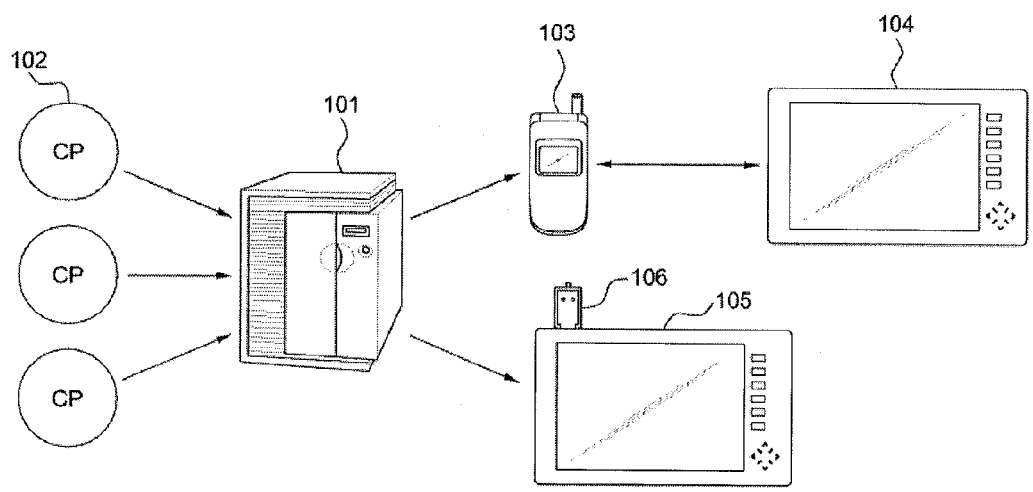
FIG. 1 is a view illustrating an entire process of providing content information according to an embodiment of the present invention.

Hereinafter, embodiments of the present invention will be described in detail with reference to the accompanying drawings. However, the present invention is not limited to the embodiments. Like reference numerals denote like elements throughout the drawings.

FIG. 1 is a view illustrating an entire process of providing content information according to an embodiment of the present invention.

The present invention relates to content-based telematics, and is characterized by providing content information using a wireless communication device performing a communication function with a navigation device.

Referring to FIG. 1, a content managing server 101 may collect various contents from a plurality of content providers 102. For example, the content managing server 101 may collect news information, stock information, gas information, entertainment information, and the like. That is, the contents are not restricted to specific ones. Any transferable contents may be target contents.

The content managing server 101 may transmit collected content information to navigation devices 104 and 105. As an example, the navigation device 104 may indirectly receive the content information from the content managing server 101 using a wireless communication terminal 103. For example, the wireless communication terminal 103 may include various portable terminals, such as a cellular phone, a PCS phone, or a PDA phone.

And, the navigation device 105 may directly receive the content information from the content managing server 101 using a wireless Internet access device 106. For example, the wireless. Internet access device 106 may include a wireless Internet modem related to WIBRO or HSDPA. The types of the wireless communication terminal 103 and the wireless Internet access device 106 are not limited.

Resultantly, the navigation devices 104 and 105 may receive the content information from the content managing server 101 through the wireless communication terminal 103 or the wireless Internet access device 106.

Figure 2:
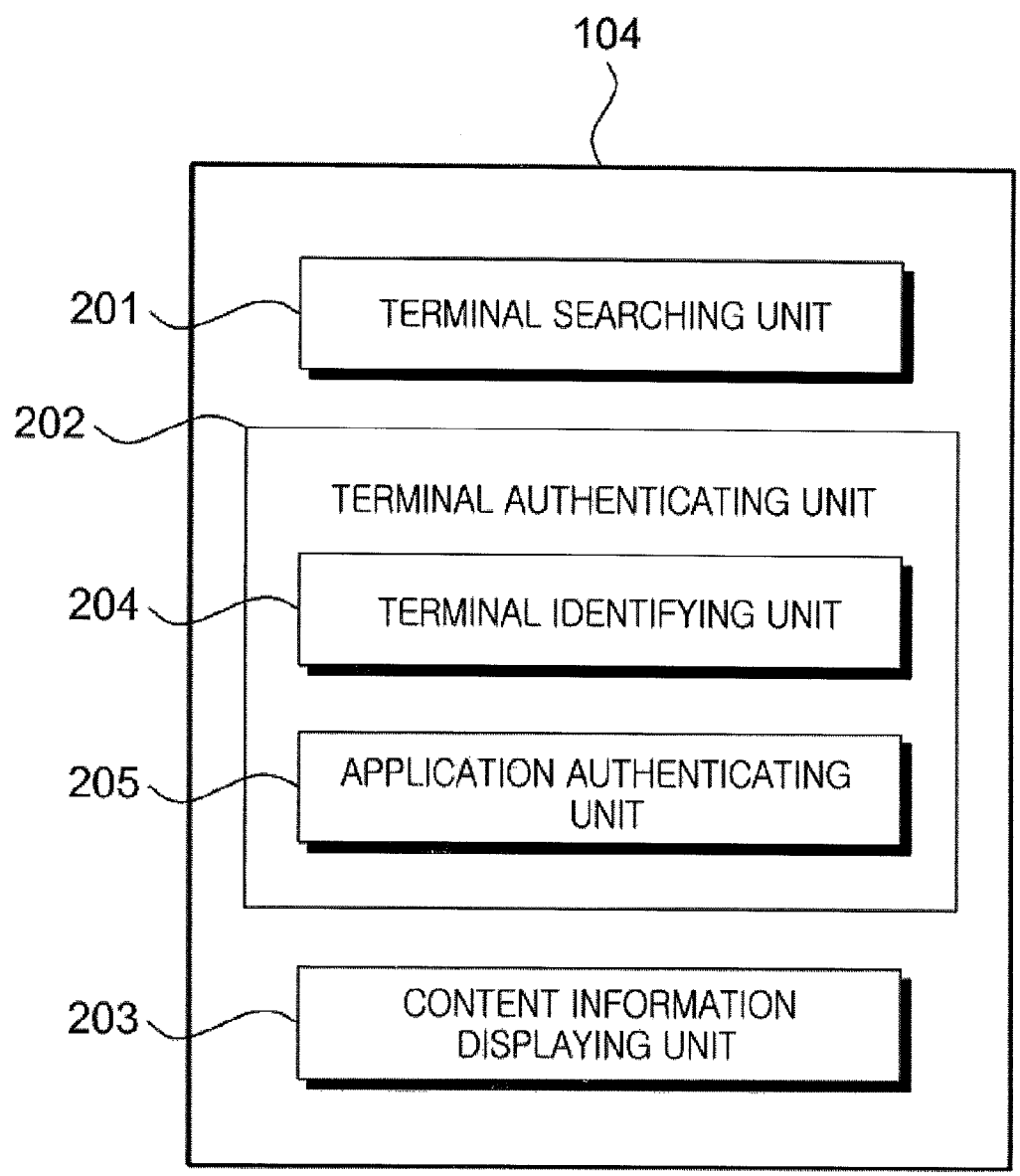
FIG. 2 is a block diagram illustrating an entire construction of a navigation device according to an embodiment of the present invention.

FIG. 2 is a block diagram illustrating an entire construction of a navigation device according to an embodiment of the present invention.

Referring to FIG. 2, the navigation device 104 may include a terminal searching unit 201, a terminal authenticating unit 202, and a content information displaying unit 203. The navigation device 104 shown in FIG. 2 means a device that may indirectly receive content information from the content managing server 101 through the wireless communication terminal 103.

The terminal searching unit 201 may search a wireless communication terminal that may perform a near field wireless communication in response to a content information providing request. For example, if a user makes a content information providing request through a display of the navigation device 104, the navigation device 104 may search the wireless communication terminal 103 located near. As an example, the wireless communication terminal 103 may include a cellular phone or a PDA that supports a WPAN (Wireless Personal Area Network).

At this time, the wireless communication terminal 103 may be a terminal that may perform near field communication with the navigation device 104. For example, the near field communication may include wireless communication scheme, such as a RF (Radio Frequency) type, a BLUETOOTH® type, a ZIGBEE® type, and a UWB (Ultrawideband) type.

The terminal authenticating unit 202 may perform terminal authentication on whether the searched wireless communication terminal has been subscribing for a content providing service. Referring to FIG. 2, the terminal authenticating unit 202 may include a terminal identifying unit 204 and an application authenticating unit 205.

The terminal identifying unit 204 may identify whether the terminal is a terminal registered in the content managing server 101 using terminal information of the wireless communication terminal 103 (server authentication). At this time, the terminal identifying unit 204 may identify whether the terminal is a terminal registered in the content managing server 101 using terminal information including at least one of identification data, a terminal model, or a product number of the wireless communication terminal 103. As an example, the identification data may include an MIN (Mobile Identification Number) and a UUID (Universal Unique Identifier) of the wireless communication terminal 103.

At this time, the content managing server 101 may process the content information to be applied to the navigation device 104. The content managing server 101 may process the content information received from the content provider 102 based on display setup information of the navigation device 104. For example, the content managing server 101 may compress and process a moving picture content to be suitable for wireless communication.

The application authenticating unit 205 may generate a near field wireless connection with the wireless communication terminal 103 and then may perform application authentication using wireless connection information (application authentication). At this time, the near field wireless connection may be wireless connection based on a BLUETOOTH® type. At this time, the application authenticating unit 205 may perform the application authentication by performing matching between near field wireless connection information and terminal identification data stored in each of the wireless communication terminal 103 and the navigation device 104. At this time, the near field wireless connection information may include a BLUETOOTH® address. And, the terminal identification data may include an MIN of the wireless communication terminal 103.

As an example, in a case where the terminal identification data stored in the wireless communication terminal 103 and the navigation device 104 do not match each other, the terminal identifying unit 204 may identify whether the wireless communication terminal 103 has been registered in the content managing server 101.

If it is identified that the wireless communication terminal 103 has been subscribing for the content providing service, the content information displaying unit 203 may receive the content information from the wireless communication terminal 103 and may display the content information on a display. As an example, the content information displaying unit 203 may receive at least one of (1) traffic information, (2) life information, or (3) mobile application information and may display it.

At this time, the traffic information may be information on traffic circumstances of a travelling path along which a user drives (for example, traffic circumstance information or CCTV information, etc.). And, the life information may be information for user's convenience (for example, news information, stock information, weather information, etc.) other than information related to unique functions of the navigation device. And, the mobile application information may be information that may provide a communication service provider with useful services through wireless communication (for example, customer information for quick delivery service, user location information for emergency service, etc.).

At this time, in a case where content information related to location information is provided, the content information displaying unit 203 may display it in association with a map stored in the navigation device 104. That is, the content information displaying unit 203 may display a location represented by the content information on map data.

Figure 3:
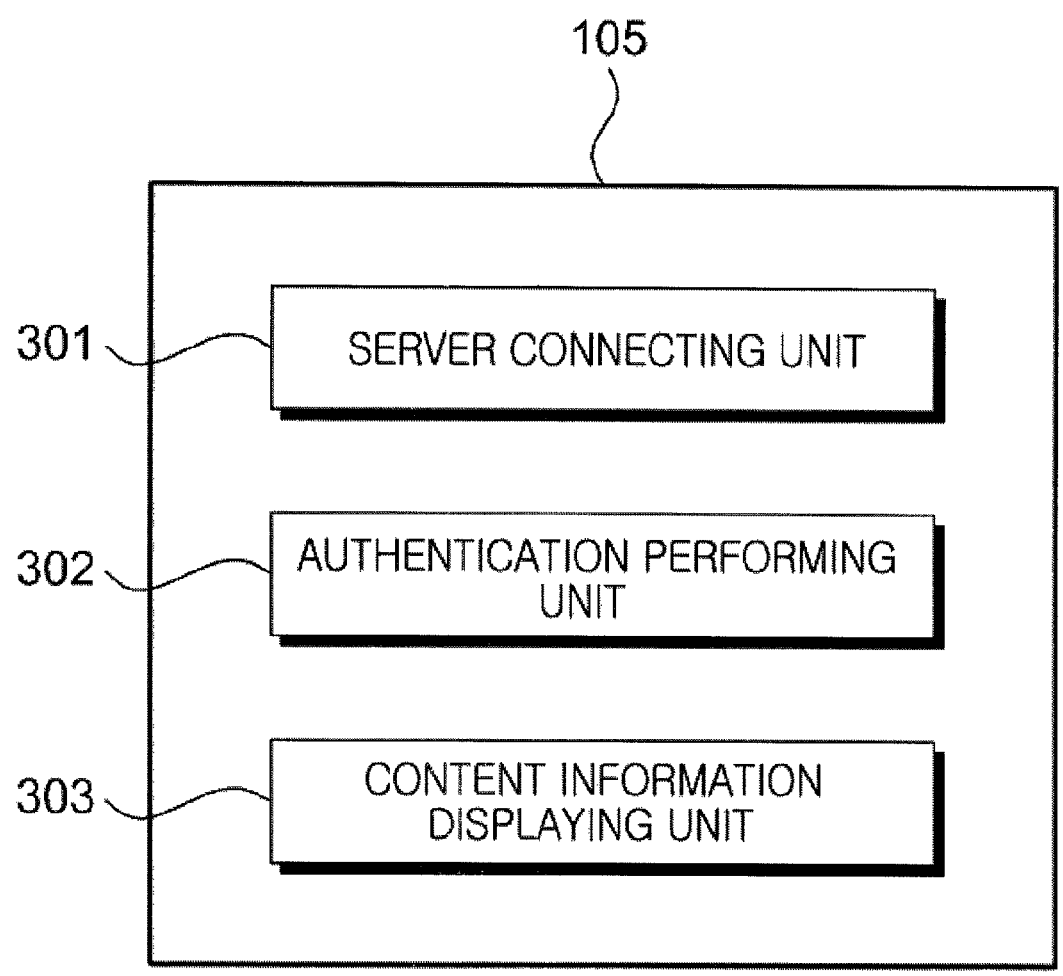
FIG. 3 is a block diagram illustrating an entire construction of a navigation device according to another embodiment of the present invention.

FIG. 3 is a block diagram illustrating an entire construction of a navigation device according to another embodiment of the present invention.

Referring to FIG. 3, the navigation device 105 may include a server connecting unit 301, an authentication performing unit 302, and a content information displaying unit 303. The navigation device 105 shown in FIG. 3 means a device that may directly receive content information from the content managing server 101 through the wireless Internet access device 106.

The server connecting unit 301 may perform wireless connection with the content managing server 101 through the wireless Internet access device 106 in response to a content information providing request. As an example, the wireless Internet access device 106 may include a modem that may access wireless Internet by EV-DO scheme, HSDPA scheme, or WIBRO scheme. Or, the wireless Internet access device 106 may be embedded in the navigation device 105 or detachably provided at an outside of the navigation device 105.

The authentication performing unit 302 may perform authentication on whether the navigation device 105 has been subscribing for the content providing service. At this time, the authentication performing unit 302 may identify whether the navigation device 105 has been registered in the content managing server 101 using identification data of the navigation device 105. For example, the identification data may include a UUID, a terminal number, or a product number of the navigation device 105.

The content information displaying unit 303 may receive the content information through the wireless Internet access device 106 from the content managing server 101 and may display it. At this time, the content information displaying unit 303 may receive at least one of (1) traffic information, (2) life information, or (3) mobile application information from the content managing server 101 and may display it. As an example, in a case where content information related to location information is provided to a user, the content information displaying unit 303 may display it in association with the map stored in the navigation device 105.

Figure 4:
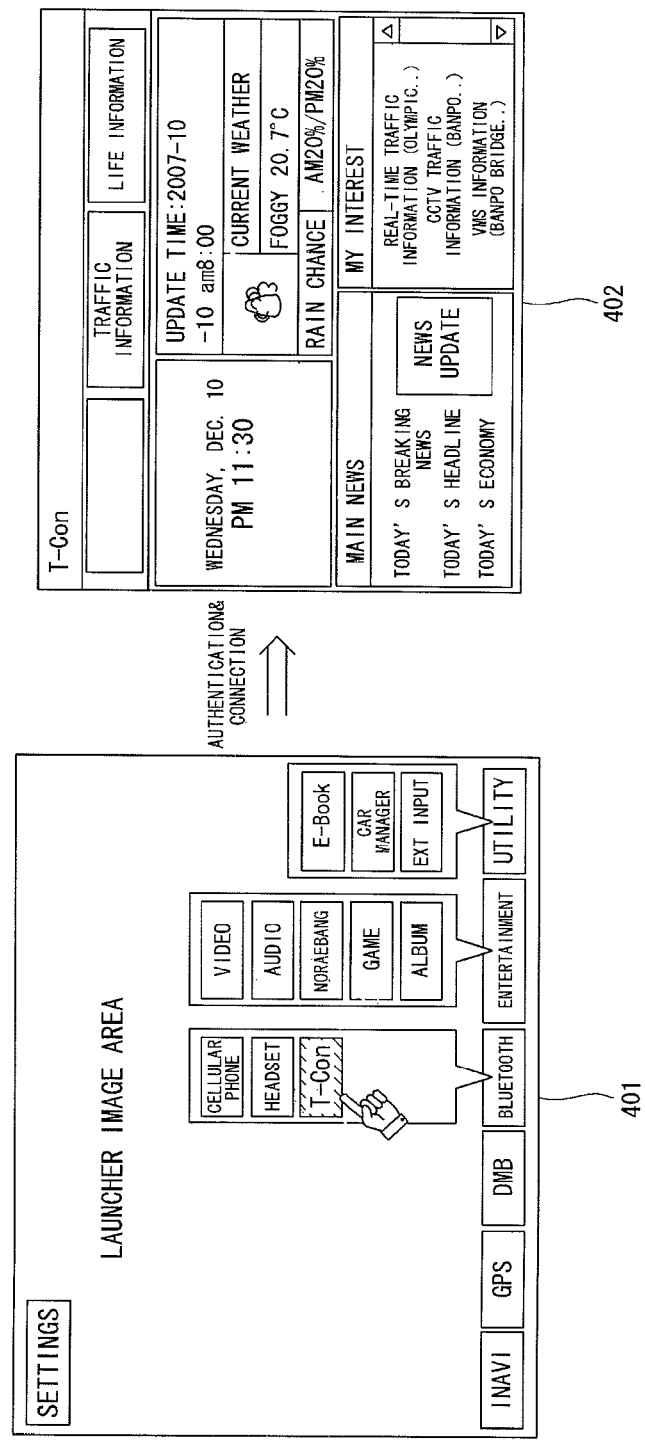
FIG. 4 is a view illustrating an exemplary main screen of providing content information when receiving a content information providing request according to an embodiment of the present invention.

FIG. 4 is a view illustrating an exemplary main screen of providing content information when receiving a content information providing request according to an embodiment of the present invention.

As an example, a user may select a T-CON icon on an initial screen 401 of the navigation device 104 or 105 to use the content information through the navigation device 104 or 105. Then, the navigation device 104 may search the wireless communication terminal 103 located near, may authenticate whether the terminal has been subscribing the service, and may connect to the wireless communication terminal 103 through near field wireless connection. At this time, the wireless communication terminal 103 may receive the content information through the content managing server 101. If wireless connection is made, the navigation device 104 may provide the user with a main launcher interface 402 corresponding to a current time point.

As another example, the navigation device 105 may connect to the content managing server 101 through the wireless Internet access device 106. And, if authentication on the navigation device 105 is completed, the navigation device 104 may provide the main launcher interface 402 corresponding to a current time point.

Then, the user may use the content information by selecting the content information provided through the main launcher interface 402.

Figure 5:
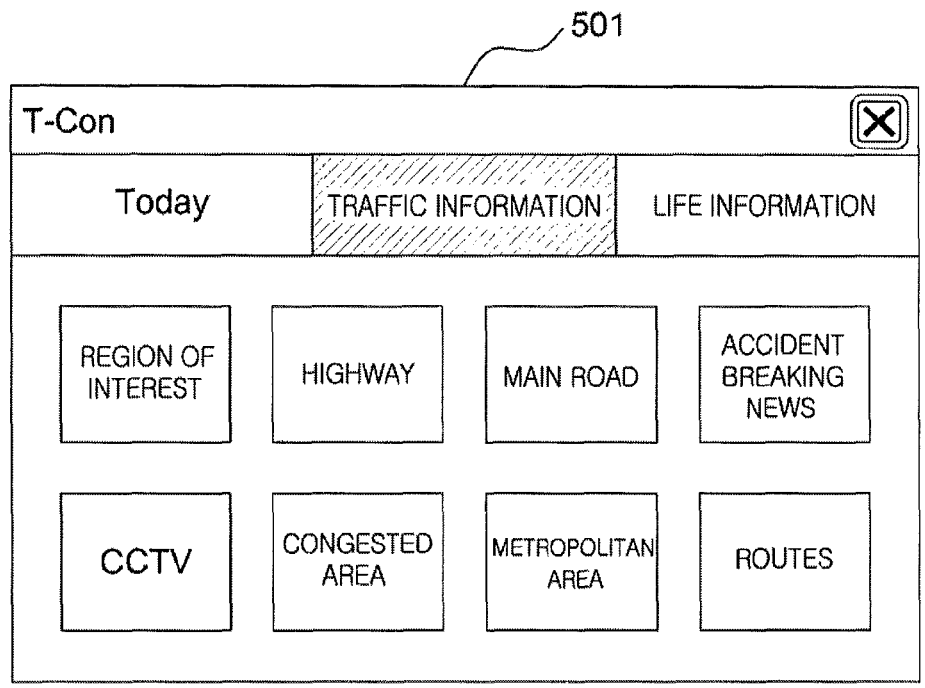
FIG. 5 is a view illustrating an example of traffic information and life information according to an embodiment of the present invention.
Figure 5:
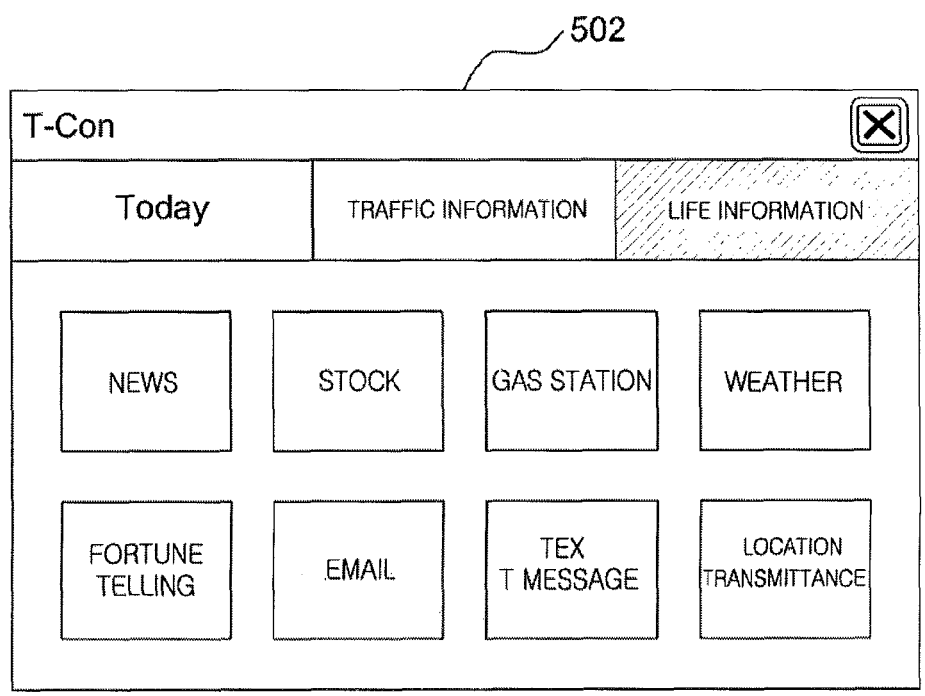

FIG. 5 is a view illustrating an example of traffic information and life information according to an embodiment of the present invention.

As an example, if the user sets up a traffic information tab on the main launcher interface 402, the navigation device 104 or 105 may provide the user with a traffic information interface 501 including specific information related to traffic information. As can be seen in FIG. 5, the traffic information may include information on "interested region", "highway", "main road", "accident breaking news", "CCTV", "congested area", "metropolitan area", and "routes". If the user selects each icon, specific information corresponding to the icon may be provided to the user in the form of a moving picture or text.

If the user selects icon "accident breaking news", content of an accident occurring on a user's travelling path may be displayed on the display of the navigation device 104 or 105 in the form of text or a moving picture. Further, in the case of being related to location information among the traffic information, corresponding traffic information may be provided to the user in association with map data stored in the navigation device 104 or 105.

As another example, if the user sets up a life information tab on the main launcher interface 402, the navigation device 104 or 105 may provide the user with a life information interface 502 including specific information related to life information. As can be seen in FIG. 5, the life information may include information on "news", "stock", "gas station", "weather", "fortune telling", "email", "text message", or "location transmittance". If the user selects an icon displayed on the life information interface 502, specific content corresponding to the selected icon may be displayed on the display in the form of text or a moving picture.

Consequently, the navigation device 104 or 105 according to the embodiments of the present invention may provide traffic circumstance information for driver and infotainment services for passenger by receiving the content information through the wireless communication device.

Figure 6:
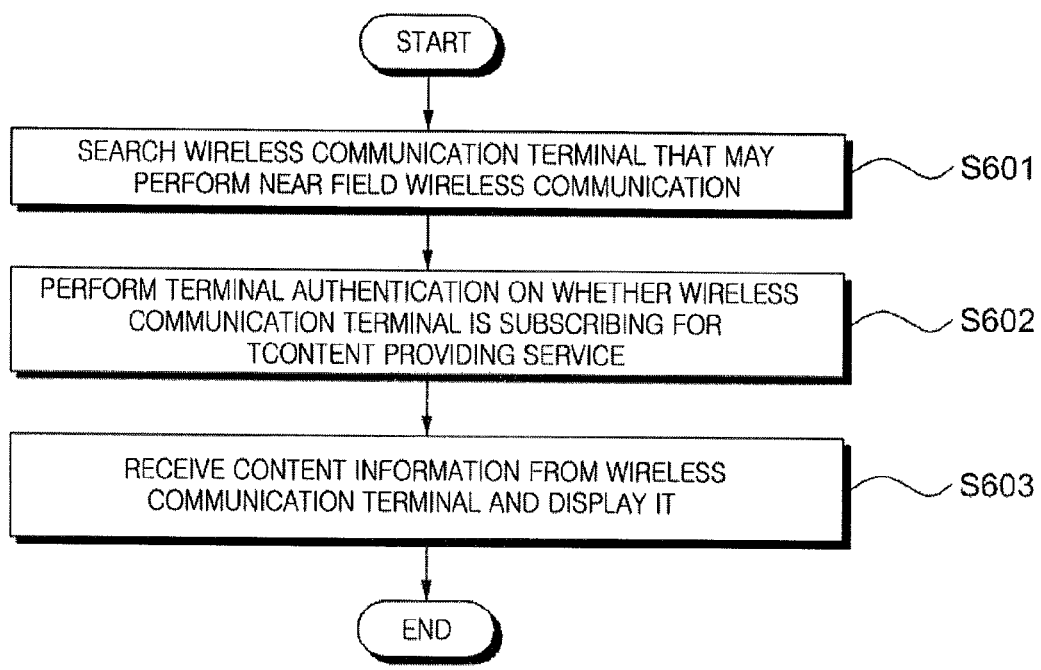
FIG. 6 is a flowchart illustrating a method of providing content information through a navigation device according to an embodiment of the present invention.

FIG. 6 is a flowchart illustrating a method of providing content information through a navigation device according to an embodiment of the present invention. At this time, FIG. 6 illustrates a method that may be applied to the navigation device 104.

In step S601, the navigation device 104 may search the wireless communication terminal 103 that may perform near field wireless connection in response to a content information providing request.

In step S602, the navigation device 104 may perform terminal authentication on whether the searched wireless communication terminal 103 has been subscribing for a content providing service.

At this time, step S602 of performing terminal authentication may include a step of identifying whether the terminal is a terminal registered in the content managing server 101 using terminal information of the wireless communication terminal 103. At this time, the content managing server 101 may process the content information to be applied to the navigation device 104.

As an example, in the step of identifying whether the terminal is a terminal registered in the content managing server 101, the navigation device 104 may identify whether the terminal is a terminal registered in the content managing server 101 using terminal information that includes at least one of identification data, a terminal model, or a product number of the wireless communication terminal 103.

In step S602 of performing the terminal authentication, the navigation device 104 may include the steps of forming near field wireless connection with the wireless communication terminal 103 and then performing application authentication using wireless connection information.

As an example, in the step of performing the application authentication, the navigation device 104 may perform the application authentication by performing matching on near field wireless connection information and terminal identification data stored in each of the wireless communication terminal 103 and the navigation device 104. If the terminal identification data do not match each other through the application authentication in the step of identifying whether the terminal is a terminal registered in the content managing server 101, the navigation device 104 may identify whether the wireless communication terminal 103 is a terminal registered in the navigation device 104.

If it is identified in step S603 that the wireless communication terminal 103 has been subscribing for the content providing service, the navigation device 104 may receive the content information from the wireless communication terminal 103 and may display it on the display. As an example, in step S603, the navigation device 104 may receive at least one of (1) traffic information, (2) life information, or (3) mobile application information from the wireless communication terminal 103 and may display it. At this time, in the case of providing content information related to location information, the navigation device 104 may display the content information in association with the map.

Figure 7:
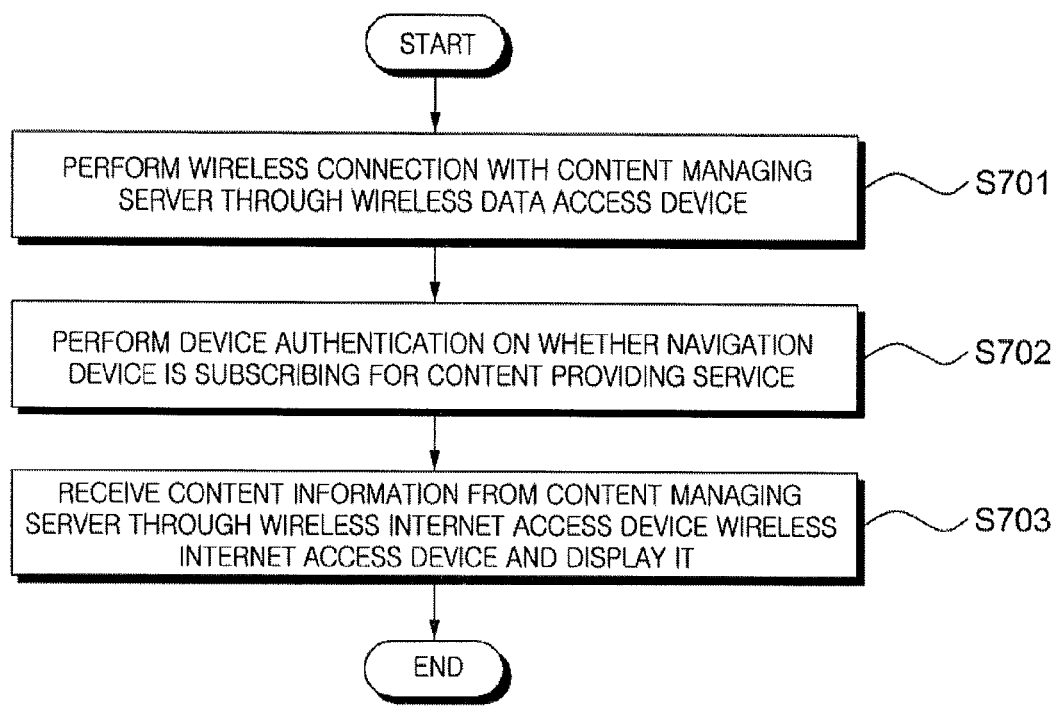
FIG. 7 is a flowchart illustrating a method of providing content information through a navigation device according to another embodiment of the present invention.

FIG. 7 is a flowchart illustrating a method of providing content information through a navigation device according to another embodiment of the present invention.

In step S701, the navigation device 105 may perform wireless connection with the content managing server 101 through the wireless Internet access device 106.

In step S702, the navigation device 105 may perform device authentication on whether the navigation device 105 has been subscribing for the content providing service. At this time, the navigation device 105 may identify whether the navigation device 105 has been registered in the content managing server 101 using identification data of the navigation device 105. At this time, the content managing server 101 may process the content information to be applied to the navigation device 105.

In step S703, the navigation device 105 may receive the content information through the wireless Internet access device 106 from the content managing server 101 and may display it on the display. At this time, the navigation device 105 may receive at least one of (1) traffic information, (2) life information, or (3) mobile application information from the content managing server 101 and may display it. And, in the case of providing content information related to location information, the navigation device 105 may display the content information in association with the map.

Descriptions given in connection with FIGS. 1 to 5 may be referred to for what was not described in FIGS. 6 and 7.

The method of providing a content using a wireless communication device according to an embodiment of the present invention includes a computer readable medium including a program command for performing operations implemented by a computer. The computer readable medium may include a program command, a data file, and a data structure alone or in a combination thereof. The medium or the program command may be one specially designed or constructed for the present invention or one known to one of ordinary skill in the computer software art. Examples of the computer readable recording medium may include magnetic media, such as hard disks, floppy disks, or magnetic tapes, magneto-optical media, such as CD-ROMs or DVDs, and hardware devices, such as ROMs, RAMs, or flash memories, which are specially constructed for storing and executing the program command. Examples of the program command may include machine language codes made by compiler or high class language codes executable by computer using an interpreter.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

The invention claimed is:

1. A computer implemented navigation device comprising: a computer implemented terminal searching unit that searches for a wireless communication mobile terminal through a first wireless network which is using a near field wireless communication in response to a content information providing request, wherein the wireless communication mobile terminal can connect to a second wireless network; a computer implemented terminal authenticating unit that determines whether the wireless mobile terminal has access to the content provider's server through the second wireless network for receiving the content information, and that includes a computer-implemented terminal identifying unit that identifies whether the wireless communication terminal is a terminal registered with a content-managing server using terminal information, said terminal information being selected from the group consisting of identification data, a terminal model, and a product number of the wireless communication terminal; and a computer implemented content information displaying unit that, if it is identified that the wireless communication mobile terminal has access to the content providing service, receives content information from the wireless communication mobile terminal and displays the content information on a computer implemented content information displaying device, wherein the computer implemented content information displaying device receives and displays information from the wireless communication terminal, said information being selected from the group consisting of traffic information, life information, and mobile application information, wherein in a case of providing content information related to location information, the computer implemented content information displaying unit displays the content information in association with a map stored in the navigation device.

2. The computer implemented navigation device of claim 1, wherein the computer implemented terminal authenticating unit further includes a computer implemented application authenticating unit that forms a near field wireless connection with the wireless communication terminal and then performs application authentication using wireless connection information.

3. The computer implemented navigation device of claim 2, wherein the computer implemented content managing server processes the content information to be applied to the navigation device.

4. The computer implemented navigation device of claim 2, wherein the computer implemented application authenticating unit performs application authentication by performing matching on near field wireless connection information and terminal identification data stored in each of the wireless communication terminal and the navigation device.

5. The computer implemented navigation device of claim 4, wherein the computer implemented terminal identifying unit identifies whether the wireless communication terminal is registered with the content managing server in a case in which the terminal identification data do not match each other through the application authentication.

6. A method of providing content information through a navigation device, said method comprising: searching for a wireless communication mobile terminal through a first wireless network which is using a near field wireless communication in response to a content information providing request, wherein the wireless communication mobile terminal can connect to a second wireless network; determining whether the wireless communication mobile terminal has access to the content provider's server through the second wireless network for receiving the content information, and identifying whether the wireless communication terminal is a terminal registered in a content managing server using terminal information including at least one of identification data, a terminal model, and a product number of the wireless communication terminal; receiving content information from the wireless communication mobile terminal, wherein the content information is selected from the group consisting of traffic information, life information, and mobile application information; and displaying the content information on a display if it is identified that the wireless communication mobile terminal is a terminal subscribing to the content providing service, wherein in a case of providing content information related to location information, displaying the content information comprises displaying the content information in association with a map stored in the navigation device.

7. The method of claim 6, wherein determining whether the wireless communication mobile terminal has access to the content provider's server further includes: forming a near field wireless connection with the wireless communication terminal; and performing application authentication using wireless connection information.

8. The method of claim 7, wherein the content managing server processes the content information to be applied to the navigation device.

9. The method of claim 7, wherein identifying whether the wireless communication terminal is a terminal registered with the content managing server comprises using terminal information including at least one of identification data, a terminal model, and a product number of the wireless communication terminal.

10. The method of claim 7, wherein determining whether the wireless communication mobile terminal has access to the content provider's server comprises performing matching on near field wireless connection information and terminal identification data stored in each of the wireless communication terminal and the navigation device.

11. The method of claim 10, wherein identifying whether the wireless communication terminal is a terminal registered with the content managing server is performed in a case in which the terminal identification data do not match each other through the application authentication.

* * * * *